(12) United States Patent
Hiroya

(10) Patent No.: US 11,557,287 B2
(45) Date of Patent: Jan. 17, 2023

(54) PRONUNCIATION CONVERSION APPARATUS, PITCH MARK TIMING EXTRACTION APPARATUS, METHODS AND PROGRAMS FOR THE SAME

(71) Applicant: NIPPON TELEGRAPH AND TELEPHONE CORPORATION, Tokyo (JP)

(72) Inventor: Sadao Hiroya, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/049,554

(22) PCT Filed: Apr. 9, 2019

(86) PCT No.: PCT/JP2019/015418
§ 371 (c)(1),
(2) Date: Oct. 21, 2020

(87) PCT Pub. No.: WO2019/208193
PCT Pub. Date: Oct. 31, 2019

(65) Prior Publication Data
US 2021/0241754 A1 Aug. 5, 2021

(30) Foreign Application Priority Data
Apr. 25, 2018 (JP) .............................. JP2018-084381

(51) Int. Cl.
*G10L 15/187* (2013.01)
*G10L 15/02* (2006.01)
(Continued)

(52) U.S. Cl.
CPC ............ *G10L 15/187* (2013.01); *G10L 15/02* (2013.01); *G10L 15/04* (2013.01); *G10L 15/22* (2013.01);
(Continued)

(58) Field of Classification Search
None
See application file for complete search history.

(56) References Cited

U.S. PATENT DOCUMENTS

2005/0038654 A1* 2/2005 Emonts ................. G10L 15/005
704/256
2009/0089063 A1* 4/2009 Meng ..................... G10L 21/00
704/270

(Continued)

FOREIGN PATENT DOCUMENTS

| JP | 2013-2388191 A | 11/2013 |
| JP | 2016-040571 A | 3/2016 |
| JP | 2016-133522 A | 7/2016 |

OTHER PUBLICATIONS

Drugman et al. (2009) "Glottal Closure and Opening Instant Detection from Speech Signals," Prc. Interspeech, Sep. 2009, pp. 2891-2894.

(Continued)

*Primary Examiner* — Shaun Roberts

(57) ABSTRACT

Provided is a system which allows a learner who is a non-native speaker of a given language to intuitively improve pronunciation of the language. A pronunciation conversion apparatus includes a conversion section which converts a first feature value corresponding to a first speech signal obtained when a first speaker who speaks a given language as his/her native language speaks another language such that the first feature value approaches a second feature value corresponding to a second speech signal obtained when a second speaker who speaks the other language as (Continued)

his/her native language speaks the other language, each of the first feature value and the second feature value is a feature value capable of representing a difference in pronunciation, and a speech signal obtained from the first feature value after the conversion is presented to the first speaker.

7 Claims, 4 Drawing Sheets

(51) Int. Cl.
*G10L 15/04* (2013.01)
*G10L 15/22* (2006.01)
*G10L 25/06* (2013.01)
*G10L 25/12* (2013.01)
*G10L 25/18* (2013.01)
*G10L 25/90* (2013.01)

(52) U.S. Cl.
CPC .............. *G10L 25/06* (2013.01); *G10L 25/12* (2013.01); *G10L 25/18* (2013.01); *G10L 25/90* (2013.01)

(56) References Cited

U.S. PATENT DOCUMENTS

| | | | |
|---|---|---|---|
| 2010/0049522 A1* | 2/2010 | Tamura | G10L 13/033 704/264 |
| 2013/0218568 A1* | 8/2013 | Tamura | G10L 13/06 704/260 |
| 2015/0127349 A1* | 5/2015 | Agiomyrgiannakis | G10L 13/02 704/266 |

OTHER PUBLICATIONS

Tsubota et al. (1999) "English Pronunciation Instruction System for Japanese using Formant Structure Estimation", Spoken Language Processing 27-12.

Felps et al. (2009) "Foreign accent conversion in computer assisted pronunciation training" Speech Communication 51, 920-932.

* cited by examiner

PRONUNCIATION CONVERSION APPARATUS, PITCH MARK TIMING EXTRACTION APPARATUS, METHODS AND PROGRAMS FOR THE SAME

CROSS-REFERENCE TO RELATED APPLICATIONS

This application is a U.S. 371 Application of International Patent Application No. PCT/JP2019/015418, filed on 9 Apr. 2019, which application claims priority to and the benefit of JP Application No. 2018-084381, filed on 25 Apr. 2018, the disclosures of which are hereby incorporated herein by reference in their entireties.

TECHNICAL FIELD

The present invention relates to a pronunciation conversion apparatus which is used when a non-native speaker of a given language learns pronunciation when the given language is spoken, a pitch mark timing extraction apparatus which is used when pronunciation is converted, a pronunciation conversion method, a pitch mark timing extraction method, and a program.

BACKGROUND ART

When a non-native speaker learns pronunciation, it is common that a learner (non-native speaker) listens to the pronunciation of a native (native speaker), speaks by imitating the pronunciation, the native makes an evaluation or an evaluation of pronunciation is conducted by using Computer-Assisted Language Learning (CALL), and a pronunciation error is visually understood. NON-PATENT LITERATURE 1 discloses a system which is an example of the CALL, and issues an articulation instruction based on evaluation by formant analysis and phoneme recognition.

CITATION LIST

Non-Patent Literature

[NON-PATENT LITERATURE 1] Tsubota Yasushi, Dantsuji Masatake, Kawahara Tatsuya, "English Pronunciation Instruction System for Japanese using Formant Structure Estimation", Spoken Language Processing 27-12, 1999

SUMMARY OF THE INVENTION

Technical Problem

In the technique in NON-PATENT LITERATURE 1, feedback on an evaluation result is visually given, but a problem arises in that it is difficult for the learner to intuitively understand how an error is made and how the error is to be corrected, and it is difficult to improve the pronunciation.

In view of the above problem, an object of the present invention is to provide a system which allows a learner to intuitively improve pronunciation.

Means for Solving the Problem

In order to solve the above problem, according to an aspect of the present invention, a pronunciation conversion apparatus includes a conversion section which converts a first feature value corresponding to a first speech signal obtained when a first speaker who speaks a given language as his/her native language speaks another language such that the first feature value approaches a second feature value corresponding to a second speech signal obtained when a second speaker who speaks the other language as his/her native language speaks the other language, each of the first feature value and the second feature value is a feature value capable of representing a difference in pronunciation, and a speech signal obtained from the first feature value after the conversion is presented to the first speaker.

In order to solve the above problem, according to an aspect of the present invention, a pitch mark timing extraction apparatus includes: a speech segment detection section which detects a speech segment of a speech signal; an LPC analysis section which determines an LPC residual signal by using an LPC coefficient a obtained from the speech signal of the speech segment through LPC analysis by using the speech signal and the speech segment, and a first speech signal of the speech segment; a pitch mark analysis section which calculates an impulse train corresponding to an EGG glottal closure time by using the speech signal; a cross-correlation estimation section which estimates a delay of the LPC residual signal relative to the EGG glottal closure time by estimating a cross-correlation between the LPC residual signal and the impulse train, and a pitch mark time estimation section which estimates a pitch mark time based on the delay, the impulse train, and the LPC residual signal.

Effects of the Invention

According to the present invention, the effect of allowing the learner to intuitively improve the pronunciation is obtained.

DESCRIPTION OF EMBODIMENTS

Figure 1:
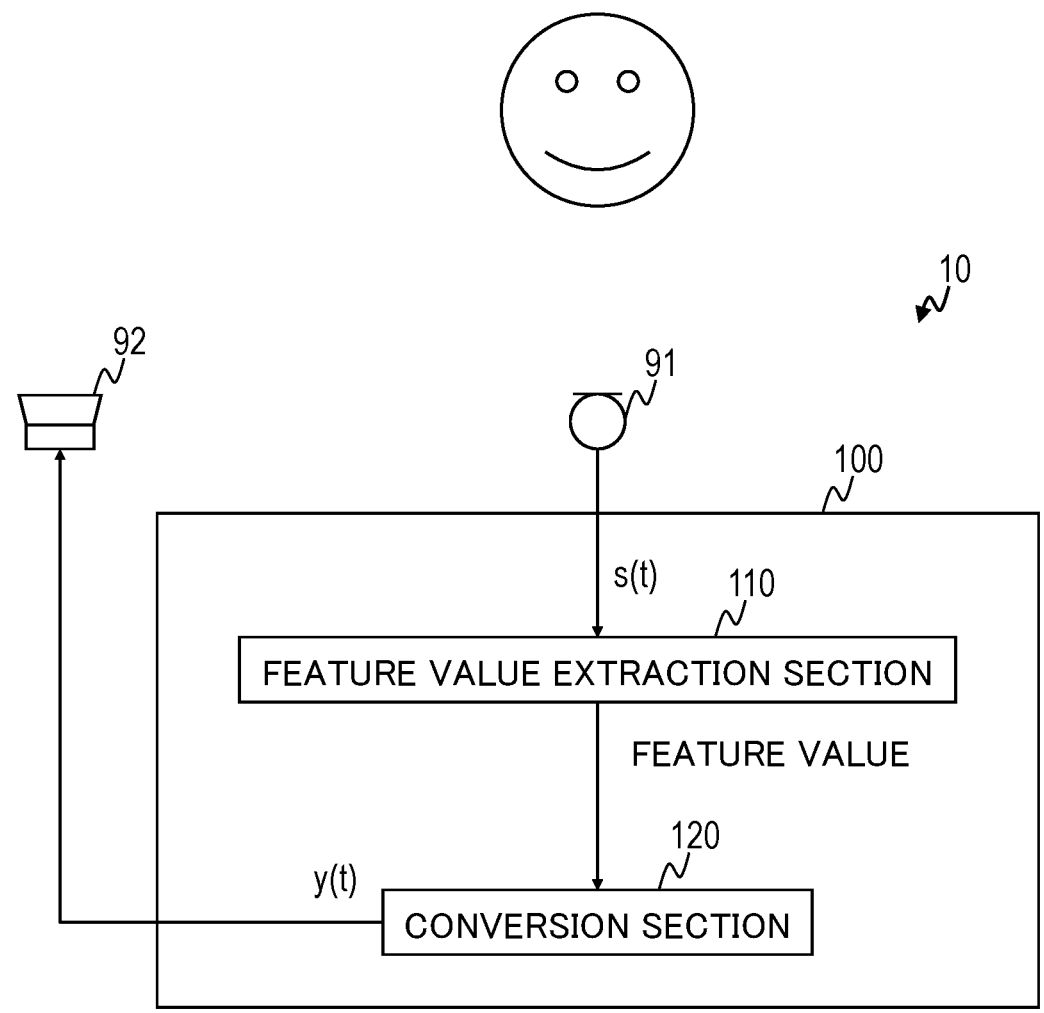
FIG. 1 is a functional block diagram of a learning system according to a first embodiment.

Hereinbelow, embodiments of the present invention will be described. Note that, in the drawings used in the following description, components having the same function and steps which perform the same processing are designated by the same reference numerals, and the duplicate description thereof will be omitted. In the following description, processing performed for each element of a vector or a matrix is applied to all elements of the vector or the matrix unless otherwise specified.

<Basic Principle of Present Embodiment>

The present embodiment is based on discovery of a natural law that, when a speaker who speaks a given language (e.g., Japanese) as his/her native language speaks another language (e.g., English), if the pronunciation of a vowel of the other language (e.g., an English word such as "had") is corrected and changed to the correct pronunciation of the other language and feedback on the correct pronunciation is given in real time, the speaker is unconsciously influenced by the correct pronunciation and the pronunciation of the speaker is improved. The real time mentioned herein means that processing is performed within such a range that a time lag caused by conversion of the pronunciation is not noticed by the speaker, and it is desirable to complete the processing in 20 milliseconds or less.

Based on this discovery, a pronunciation conversion apparatus of the present embodiment provides a system in which a learner easily and intuitively improves pronunciation by giving the learner feedback on sound in which the pronunciation of the learner (speaker) is converted to pronunciation similar to the pronunciation of a native.

First Embodiment

Figure 2:
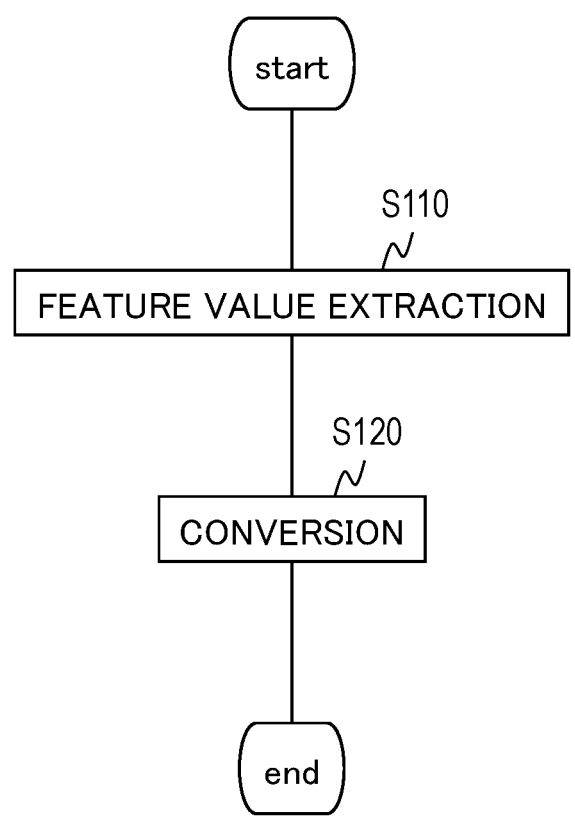
FIG. 2 is a view showing an example of a processing flow of the learning system according to the first embodiment.

FIG. 1 shows a functional block diagram of a learning system according to a first embodiment, and FIG. 2 shows its processing flow.

A learning system 10 includes a sound collection device 91, a pronunciation conversion apparatus 100, and a reproduction device 92. Further, the pronunciation conversion apparatus 100 includes a feature value extraction section 110, and a conversion section 120.

The learning system 10 collects the sound of utterance of a learner with the sound collection device 91, converts the pronunciation of the leaner included in a sound collection signal (hereinafter also referred to as an original speech signal) s(t), collected by the pronunciation conversion apparatus 100, to pronunciation similar to a pronunciation of a native, and reproduces a signal after the conversion (hereinafter also referred to as a post-conversion speech signal) y(t) in the reproduction device 92 to thereby present the post-conversion speech signal to the learner. Note that t is an index indicating a time.

The pronunciation conversion apparatus is a special device configured by reading a special program into a known or dedicated computer having a central processor (CPU: Central Processing Unit) and main memory (RAM: Random Access Memory). The pronunciation conversion apparatus executes each processing under the control of, e.g., the central processor. Data input into the pronunciation conversion apparatus or data obtained by each processing is stored in, e.g., the main memory, and the data stored in the main memory is read into the central processor on an as-needed basis, and is used in another processing. At least part of the individual processing sections of the pronunciation conversion apparatus may be configured by hardware such as an integrated circuit. Each storage section of the pronunciation conversion apparatus can be constituted by, e.g., the main memory such as the RAM (Random Access Memory) or middleware such as a relational database or a key-value store. Note that the pronunciation conversion apparatus does not necessarily need to include each storage section inside the pronunciation conversion apparatus, and each storage section may be constituted by auxiliary memory constituted by a hard disk, an optical disk, or a semiconductor memory device such as a flash memory and may be provided outside the pronunciation conversion apparatus.

Hereinafter, a description will be given of each section of the pronunciation conversion apparatus 100.

<Feature Value Extraction Section 110>

The feature value extraction section 110 receives the original speech signal s(t) as an input, extracts a feature value from the original speech signal s(t) (S110), and outputs the feature value. The feature value to be extracted herein is a feature value capable of representing a difference in pronunciation between the original speech signal s(t) and a speech signal of pronunciation serving as a target (model) (hereinafter also referred to as a target speech signal), and is, e.g., a formant frequency or a bandwidth of the formant frequency.

As an extraction method of the formant frequency, a known technique such as, e.g., an algorithm called a PEAR (phase equalization-based autoregressive exogenous model) (see Reference 1), or a method described in a second embodiment described later may be appropriately used.

(Reference 1): Oohashi, H., Hiroya, S., and Mochida, T., "Real-time robust formant estimation system using a phase equalization-based autoregressive exogenous model", Acoustical Science and Technology, vol. 36, no. 6, pp. 478-488, 2015.

For example, linear prediction coefficients $a_1, \ldots, a_P$ (P is a prediction order) are determined by analyzing the original speech signal s(t) according to PEAR (or LPC) analysis, and roots $z_1, \ldots, z_P$ of a prediction polynomial obtained with the linear prediction coefficients are determined. At this point, let $\theta_1, \ldots, \theta_P$ denote angles of imaginary roots, and let $r_1, \ldots, r_P$ denote magnitudes thereof. $\theta_p$ and a formant frequency $F_p$ satisfy the relationship of the following expression (1), and hence the formant frequency $F_p$ is determined by inversely transforming $\theta_p$. The formant frequency $F_p$ is determined from $\theta_p$ for each p ($1 \leq p \leq P$).

[Formula 1]

$$\theta_p = \frac{2\pi F_p}{f_s} \quad (1)$$

where $f_s$ represents a sampling frequency.

In the case where the bandwidth of the formant frequency is used as the feature value, when $B_p$ denotes the bandwidth of the formant frequency, the relationship of

[Formula 2]

$$r_p = e^{-\frac{\pi B_p}{f_s}} \quad (2)$$

is satisfied, and hence the bandwidth $B_p$ may be appropriately determined by inversely transforming the magnitude $r_p$.

<Conversion Section 120>

The conversion section 120 determines the post-conversion speech signal y(t) obtained by converting the original speech signal s(t) based on the feature value extracted in the feature value extraction section 110 and the feature value of the target speech signal. The post-conversion speech signal y(t) is reproduced in the reproduction device 92 in a form which can be perceived (can be heard) by the learner.

For example, the conversion section 120 receives the feature value extracted in the feature value extraction section 110 as an input, and converts the feature value such that the feature value approaches the feature value of the target speech signal (S120).

(In the Case where the Formant Frequency is Used as the Feature Value)

The post-conversion speech signal y(t) is determined by using a vocal tract spectrum A(z) corresponding to the formant frequency extracted in the feature value extraction section 110 and a vocal tract spectrum A'(z) corresponding to the formant frequency of the target speech signal, and is output. Note that z is the root of the prediction polynomial obtained with the linear prediction coefficients.

More specifically, a conversion filter F(z) corresponding to the following expression (3) is determined from the vocal tract spectrum A(z) of the original speech signal and the vocal tract spectrum A'(z) of the target speech signal and the original speech signal S(z) is passed through the conversion filter F(z), and the post-conversion speech signal Y(z) is thereby determined. That is, the post-conversion speech signal Y(z) is determined according to the expression (4). Herein, S(z) is the frequency domain representation of the original speech signal s(t). Similarly to normal speech analysis, the vocal tract spectrum is determined every 5 to 10 milliseconds. Accordingly, the conversion filter is also updated for each frame correspondingly to the vocal tract spectrum.

[Formula 3]

$$F(z) = \frac{\frac{1}{A'(z)}}{\frac{1}{A(z)}} \tag{3}$$

$$Y(z) = F(z)S(z) \tag{4}$$

For example, the vocal tract spectrum A(z) and the vocal tract spectrum A' (z) are expressed as shown below:

[Formula 4]

$$A(z) = \prod_{p=1}^{P}(1 - c_p z^{-1})(1 - c_p^* z^{-1}) \tag{5}$$

$$c_p = r_p \cos\theta_p + jr_p \sin\theta_p$$

$$c_p^* = r_p \cos\theta_p - jr_p \sin\theta_p$$

$$A'(z) = \prod_{p=1}^{P}(1 - c_p' z^{-1})(1 - c_p'^* z^{-1}) \tag{6}$$

$$c_p' = r_p \cos\theta_p' + jr_p \sin\theta_p'$$

$$c_p'^* = r_p \cos\theta_p' - jr_p \sin\theta_p'$$

Herein, $\theta'_p$ is determined from a formant frequency $F'_p$ of the target speech signal according to the following expression:

[Formula 5]

$$\theta'_p = \frac{2\pi F'_p}{f_s} \tag{7}$$

(In the Case where the Bandwidth of the Formant Frequency is Used as the Feature Value)

The post-conversion speech signal y(t) is determined by using the vocal tract spectrum A(z) corresponding to the bandwidth of the formant frequency extracted in the feature value extraction section 110 and the vocal tract spectrum A'(z) corresponding to the bandwidth of the formant frequency of the target speech signal. The expressions (3), (4), and (5) are the same as those used in the case where the formant frequency is used as the feature value.

In this case, the vocal tract spectrum A'(z) is expressed as shown below:

[Formula 6]

$$A'(z) = \prod_{p=1}^{P}(1 - c_p' z^{-1})(1 - c_p'^* z^{-1}) \tag{8}$$

$$c_p' = r_p' \cos\theta_p + jr_p' \sin\theta_p$$

$$c_p'^* = r_p' \cos\theta_p - jr_p' \sin\theta_p$$

Herein, $r_p'$ is determined from a bandwidth $B_p'$ of the formant frequency $F'_p$ of the target speech signal according to the following expression:

[Formula 7]

$$r_p' = e^{-\frac{\pi B_p'}{f_s}} \tag{9}$$

(In the Case where the Formant Frequency and the Bandwidth of the Formant Frequency are Used as the Feature Values)

The post-conversion speech signal y(t) is determined by using the vocal tract spectrum A(z) corresponding to the formant frequency and the bandwidth of the formant frequency extracted in the feature value extraction section 110 and the vocal tract spectrum A'(z) corresponding to the formant frequency and the bandwidth of the formant frequency of the target speech signal. The expressions (3), (4), and (5) are the same as those used in the case where the formant frequency is used as the feature value.

In this case, the vocal tract spectrum A'(z) is expressed as shown below:

[Formula 8]

$$A'(z) = \prod_{p=1}^{P}(1 - c_p' z^{-1})(1 - c_p'^* z^{-1}) \tag{10}$$

$$c_p' = r_p' \cos\theta_p' + jr_p' \sin\theta_p'$$

$$c_p'^* = r_p' \cos\theta_p' - jr_p' \sin\theta_p'$$

Herein, $\theta_p'$ and $r_p'$ are determined according to the expressions (7) and (9) described above.

Suppose that the feature values of the target speech signal (the formant frequency $F'_p$ and the bandwidth $B'_p$) or the vocal tract spectrum A'(z) of the target speech signal is provided in advance from the outside or pre-stored in a storage section which is not shown prior to the pronunciation conversion. For example, an utterance (may be appropriately set on any of a per-word basis, a per-sentence basis, and a per-passage basis) corresponding to the original speech signal s(t) is made by a native (native speaker), the feature value is obtained from the speech signal obtained by collecting the sound of the utterance, and the vocal tract spectrum A'(z) is determined in advance from the obtained feature value.

Further, the conversion section 120 converts the domain of a speech signal after conversion (hereinafter also referred to as a post-conversion speech signal) Y(z) to a time domain to obtain a time-domain post-conversion speech signal y(t) (see Reference 4), and outputs the time-domain post-conversion speech signal y(t). (Reference 4) Villacorta, V. M., Perkell, J. S., and Guenther, F. H., "Sensorimotor adaptation to feedback perturbations of vowel acoustics and its relation to perception", J. Acoust. Soc. Am., 2007, pp. 2306-2319, 2007.

For example, in order to convert the formant frequency of "a" of an English word "had" to that of a native, it is only required that the first formant frequency (F1) is converted to 862 Hz, and the second formant frequency (F2) is converted to 1615 Hz. These frequencies are the formant frequencies of the speech signal serving as the target. Suppose that F1 and F2 are selected from among the above-described P formant frequencies $F_1, \ldots, F_p$ and determined.

<Effect>

With the above configuration, the post-conversion speech signal y(t) is reproduced in the reproduction device 92, and is presented to the learner. The learner is unconsciously influenced by correct pronunciation and gets better at pronunciation while listening to the reproduced sound, and it becomes easy for the learner to intuitively improve the pronunciation.

Note that, an object of conventional real-time formant frequency conversion studies has been clarification of a human mechanism, and hence the conventional real-time formant frequency conversion studies mainly perform processing such as shifting the formant frequency by 100 Hz and do not have a viewpoint of improving the pronunciation of a non-native speaker, and the technical idea of converting the formant frequency from this viewpoint is the original technical idea of the present application.

When a native Japanese speaker utters an English word including a vowel [ae] (ash) such as "had", the vowel is replaced with a Japanese vowel "A", and "had" is pronounced as "HADO". F1 of the Japanese vowel "A" is about 920 Hz, and F2 thereof is about 1500 Hz. When the native Japanese speaker listens to speech in which F1 of the vowel is converted to 862 Hz and F2 thereof is converted to 1615 Hz in real time in order to learn the sound of the English vowel [ae], the speaker speaks while reducing F1 and increasing F2 such that F1 and F2 approach 862 Hz and 1615 Hz, respectively. F1 is associated with the position of a tongue in a vertical direction and F2 is associated with the position of the tongue in a front and rear direction, and hence that the formant frequencies have approached those of the English vowel means that the positions of the tongue have approached those of the English vowel. That is, it becomes possible to intuitively understand the relationship between the correct positions of the tongue of the English vowel and the formant frequencies.

<Modification 1>

In the conversion section 120, the original speech signal s(t) is converted based on the feature value extracted in the feature value extraction section 110 and the feature value of the target speech signal. However, when the original speech signal s(t) is always converted by using the same formant frequency, there are cases where unnaturalness is felt.

To cope with this, in order to eliminate the unnaturalness, a feature value (hereinafter also referred to as a "corrected target feature value") obtained by correcting the feature value of the target speech signal which is provided in advance is used as the feature value (hereinafter also referred to as the target feature value) of the target speech signal used in the conversion section 120. Suppose that the corrected target feature value is a value randomly selected from among values in the vicinity of the target feature value. In the case where the conversion is performed for each utterance in the conversion section 120, it is only required that a different corrected target feature value is appropriately used in at least part of a plurality of temporally continuous utterances.

By performing such processing, the conversion section 120 can convert the feature value extracted in the feature value extraction section 110 such that the feature value approaches the corrected target feature value by giving a random number to the target feature value, and the unnaturalness can be thereby eliminated.

For example, in the present modification, the feature value of the target speech signal is provided in advance from the outside or pre-stored in the storage section which is not shown prior to the pronunciation conversion, and the conversion section 120 gives random numbers which differ from one utterance to another to values among which the feature value of the target speech signal is centered to determine the vocal tract spectrum A' (z) from the value to which the random number is given (the corrected target feature value). With this configuration, it is possible to provide variations in the individual utterances and eliminate the unnaturalness described above.

Second Embodiment

Parts different from the first embodiment will be mainly described.

A second embodiment is different from the first embodiment in the processing of the feature value extraction section 110 of the first embodiment.

In the first embodiment, the conventional art of Reference 1 and the like may be used in the calculation of the feature value. However, in the PEAR disclosed in Reference 1, it is possible to extract the formant frequency with high accuracy in real time but, in order to do so, it is necessary to measure vocal cord vibration with a device called EEG (Electroglottography) and extract a pitch mark. Herein, as a method for extracting the pitch mark from the EGG, PTL 2 may be appropriately used.

(Reference 2) Japanese Patent Application Publication No. 2016-133522

However, in the case where consideration is given to the convenience of usage, it is preferable to be able to extract the pitch mark and the formant frequency with high accuracy only from an input speech signal (original speech signal) by using the PEAR without using the device such as the EGG. Formant analysis is used in the technique in NON-PATENT LITERATURE 1 described in the background art, but the device such as the EGG is required in the formant analysis similarly to the first embodiment, and a problem arises in that simple and easy usage is not allowed.

To cope with this, the feature value extraction section 110 of the second embodiment is characterized in that the feature value extraction section 110 does not use the EGG, and extracts the formant frequency only from the input speech signal. In particular, the EGG is conventionally required in extraction processing of a pitch mark time, but the feature value extraction section 110 of the second embodiment is characterized in that the feature value extraction section 110 does not use the EGG, and extracts the pitch mark time only from the input speech signal. With this, it is possible to implement utterance conversion with a device simpler and easier than that in the first embodiment. Note that the pitch mark time is the feature value serving as a basic technique of not only the utterance conversion but also speech synthesis, speech conversion, and speech analysis. That is, a speech segment detection section 111, an LPC analysis section 112, a pitch mark analysis section 113, a cross-correlation estimation section 114, and a pitch mark time estimation section 115 of the second embodiment can be selected and caused to function as a pitch mark timing extraction apparatus which extracts the pitch mark time, and the extracted pitch mark can be used in the speech synthesis and the speech analysis. Also in this case, the device such as the EGG is not required, and the effect of allowing the pitch mark time to be extracted simply and easily with high accuracy is obtained.

Figure 3:
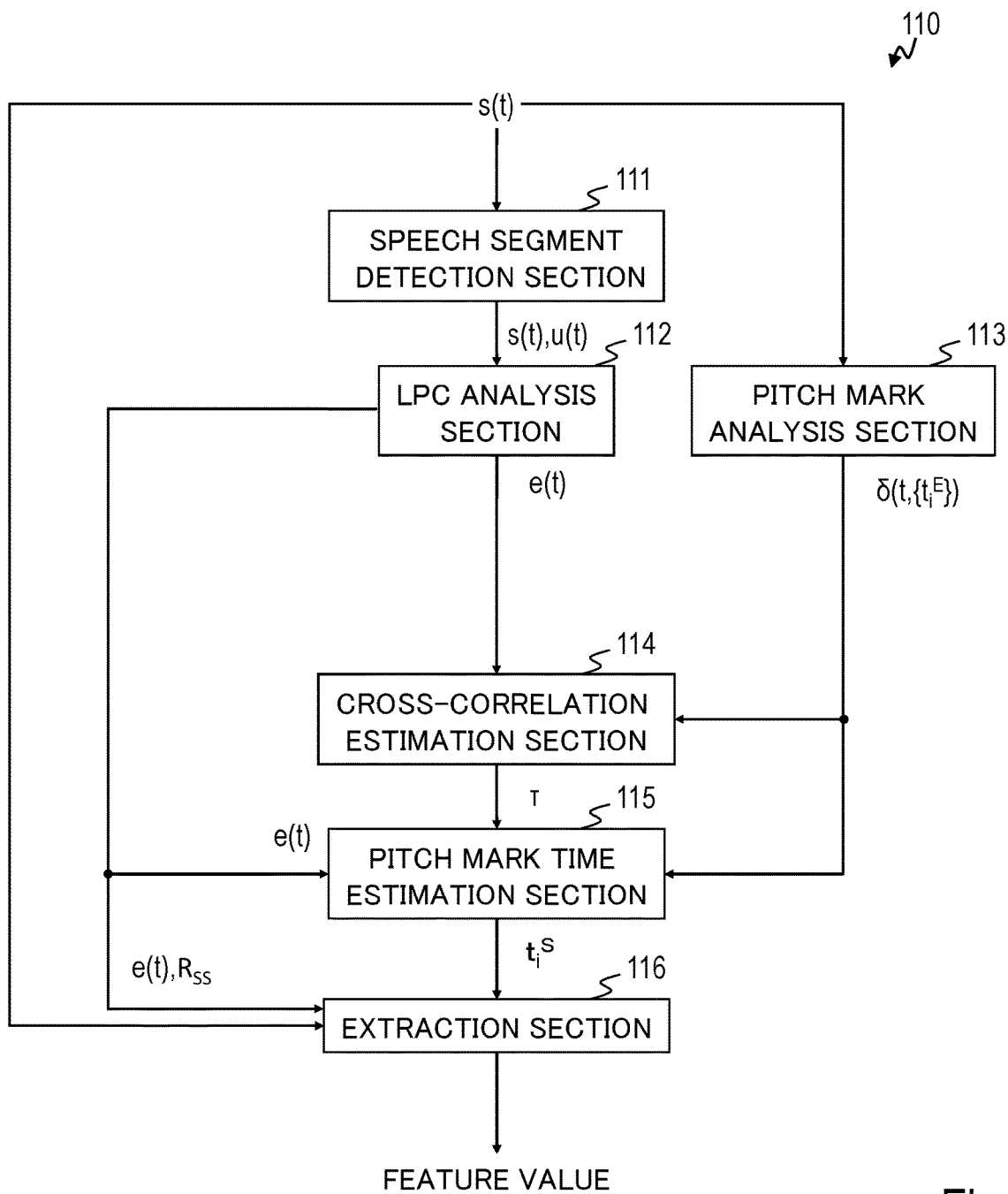
FIG. 3 is a functional block diagram of a feature value extraction section according to a second embodiment.
Figure 4:
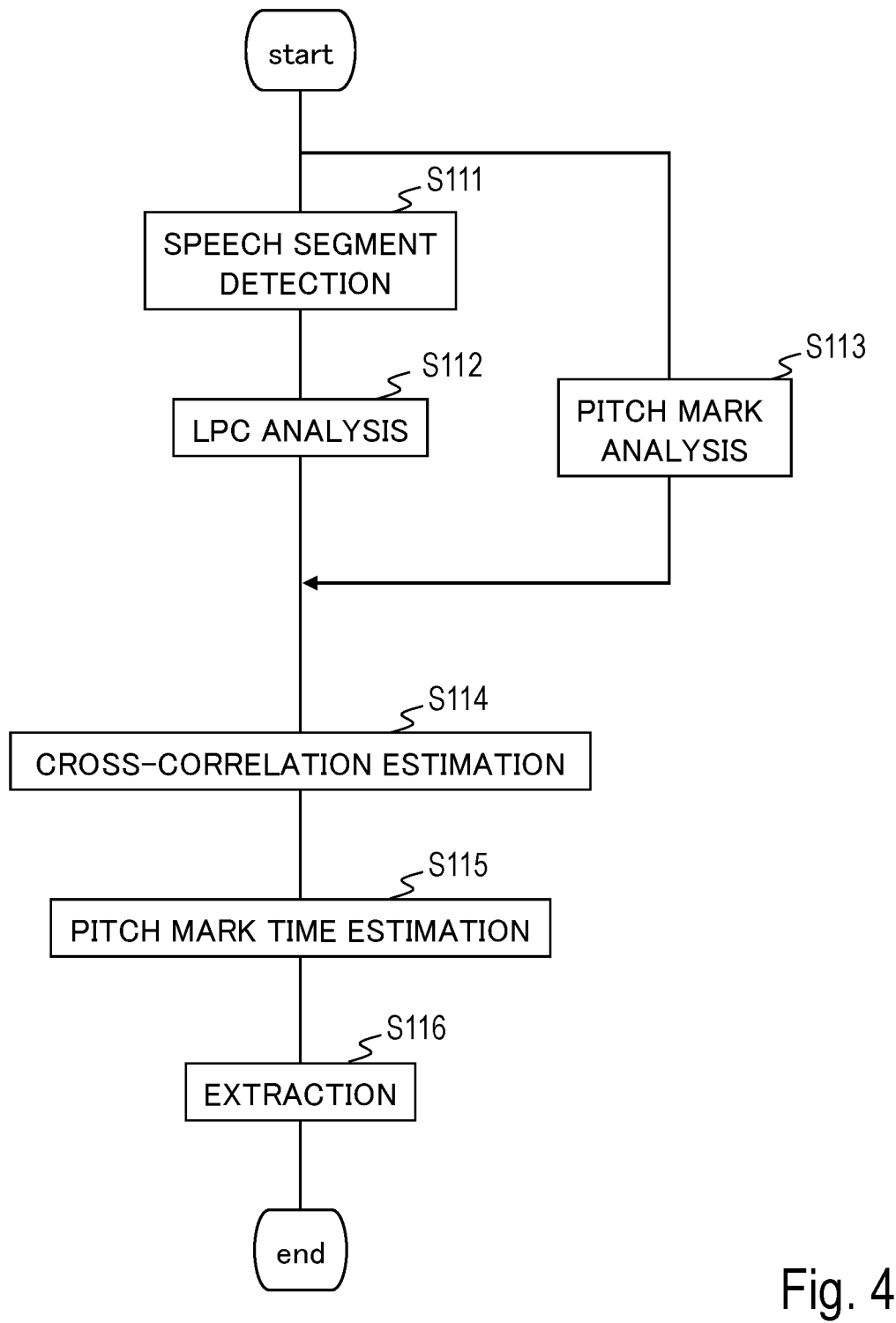
FIG. 4 is a view showing an example of a processing flow of the feature value extraction section according to the second embodiment.

FIG. 3 shows a functional block diagram of the feature value extraction section 110 of the second embodiment, and FIG. 4 shows an example of its processing flow.

The feature value extraction section 110 of the second embodiment includes the speech segment detection section 111, the LPC analysis section 112, the pitch mark analysis section 113, the cross-correlation estimation section 114, the pitch mark time estimation section 115, and an extraction section 116.

Hereinafter, the processing content of each section will be described.

<Speech Segment Detection Section 111>

First, the speech segment detection section 111 receives the original speech signal s(t), detects a speech segment of the input original speech signal s(t), and outputs the speech segment (S111). For example, the power of the original speech signal s(t) is determined and, in the case where the power is greater than a predetermined threshold value, the original speech signal s(t) is detected as the speech segment, and information indicating the speech segment (hereinafter also referred to as "speech segment information") is output. For example, let u(t) denote the speech segment information, u(t)=1 is satisfied when the speech signal s(t) is the speech segment, and u(t)=0 is satisfied when the speech signal s(t) is not the speech segment. In addition, the start time and the end time of the speech segment (and/or the start time and the end time of a segment which is not the speech segment) may be output as the speech segment information. The speech signal s(t) detected as the speech segment may be output as the speech segment information. In short, it is only required that the speech segment is recognized in the following processing, and hence the speech segment may be detected by any method and the speech segment information may be output. By performing the processing only on the speech segment in the following processing, it is possible to reduce a processing amount. Note that, in the present embodiment, u(t) denotes the speech segment information.

<LPC Analysis Section 112>

The LPC analysis section 112 receives the original speech signal s(t) and its speech segment information u(t), determines an LPC residual signal e(t) by using an LPC coefficient a obtained from the original speech signal s(t) of the speech segment through LPC analysis and the original speech signal s(t) of the speech segment (S112), and outputs an autocorrelation function $R_{ss}$ obtained in the process of the LPC analysis and the LPC residual signal e(t).

For example, in the present embodiment, the LPC analysis section 112 performs normal LPC analysis (see, e.g., Reference 3) on the original speech signal s(t) to determine the LPC coefficient a and the autocorrelation function $R_{ss}$.

(Reference 3) Furui, *Digital onsei shori* ("*Digital Speech Processing*"), Tokai University Press, 1985, pp. 60-65

Lastly, the LPC residual signal e(t) is determined by using the original speech signals s(t), s(t−1), ... , s(t−P) and the LPC coefficients a={a(1), a(2), ... , a(P)} according to the following expression:

[Formula 9]

$$e(t) = sp(t) - \sum_{p=1}^{P} a(p)sp(t-p) \quad (11)$$

where sp(t) is the original speech signal obtained by performing pre-emphasis on the original speech signal s(t) to remove tilt characteristics of a sound source spectrum. Note that the original speech signal sp(t) subjected to the pre-emphasis is represented by the following expression:

$$sp(t) = s(t) - \alpha s(t-1) \quad (12)$$

where, e.g., 0.98 is used as α. Note that the pre-emphasis is a modulation technique in which the high frequency side of a transmission signal is amplified in accordance with attenuation characteristics peculiar to a transmission path at high frequencies and the transmission signal is sent from a transmission side, and frequency characteristics of the signal received on a reception side are improved.

<Pitch Mark Analysis Section 113>

The pitch mark analysis section 113 receives the original speech signal s(t), calculates an impulse train $\delta(t, \{t_i^E\})$ having 1 at a time corresponding to an EGG glottal closure time $\{t_i^E\}$ and having 0 at the other times (S113), and outputs the impulse train $\delta(t, \{t_i^E\})$. For example, a mean-based signal x(t) in FIG. 3(b) in Reference 4 is generated from the speech signal with an algorithm called SEDREAMS in P997 of Reference 4. Note that the mean-based signal x(t) is determined according to the following expression:

[Formula 10]

$$x(t) = \frac{1}{2N+1} \sum_{m=-N}^{N} w(m)s(t+m) \quad (13)$$

where w(m) is a window function (e.g., a Hamming window) having a window length of 2N+1. At this point, a rough pitch lag (obtained by dividing the fundamental frequency by the sampling frequency) of a speaker (learner) is determined in advance, and a value obtained by multiplying the pitch lag by 1.75 corresponds to 2N+1. Alternatively, instead of determining the pitch lag of the speaker in advance, the pitch lag which maximizes the value of the autocorrelation function $R_{ss}$ determined in the LPC analysis section 112 may be used for each frame. In addition, by various pitch analyses such as a modified autocorrelation method, the pitch lag may be determined for each frame. The mean-based signal x(t) is a periodic function having a period of the pitch lag, and generates a pulse train in which a pulse is placed at a time having the minimum value, e.g., a time t at which, e.g., x(t)−x(t−1)<0 and x(t)−x(t+1)<0 are satisfied as the above-described impulse train $\delta(t, \{t_i^E\})$.

(Reference 4) T. Drugman, M. Thomas, J. Gudnason, P. Naylor, and T. Dutoit, "Detection of Glottal Closure Instants from Speech Signals: A Quantitative Review," IEEE Transactions on Audio, Speech, and Language Processing, vol. 20, no. 3, pp. 994-1006, March 2012.

<Cross-Correlation Estimation Section 114>

The cross-correlation estimation section 114 receives the LPC residual signal e(t) and the impulse train $\delta(t, \{t_i^E\})$, and estimates a cross-correlation between the LPC residual signal e(t) and the impulse train $\delta(t, \{t_i^E\})$ according to the following expression (S114), whereby the cross-correlation estimation section 114 estimates and outputs a delay T of the LPC residual signal e(t) relative to the EGG glottal closure time.

[Formula 11]

$$\tau = \operatorname{argmax} \sum_t e(t)\delta(t - j, \{t_i^E\}) \quad (14)$$

Note that the cross-correlation between the original speech signal s(t) and the impulse train $\delta(t, \{t_i^E\})$ may be calculated and the value which maximizes the value of the cross-correlation may be determined to be the delay T. At this point, the delay estimation section 114 needs to include at least a configuration for determining a value required in the calculation of the cross-correlation.

<Pitch Mark Time Estimation Section 115>

The pitch mark time estimation section 115 estimates a pitch mark time $t_i^s$ based on the delay $\tau$ determined in the cross-correlation estimation section 114, the impulse train $\delta(t, \{t_i^E\})$ determined in the pitch mark analysis section 113, and the LPC residual signal e(t) (S115), and outputs the pitch mark time $t_i^s$.

Among times included in a range $(t_i+\tau\pm\Delta)$ in the vicinity of a value $t_i+\tau$ obtained by adding the delay $\tau$ to a time $t_i$ at which the pulse is placed (the value becomes 1) by the impulse train $\delta(t, \{t_i^E\})$, a time at which the corresponding LPC residual signal e(t) is maximized or minimized is estimated as the pitch mark time $t_i^s$, and is output to the extraction section 116. Suppose that $\Delta$ is a value smaller than the fundamental period F0, and is determined in advance.

While many delays $\tau$ have positive values in the case where the LPC residual signal and the EGG are used, there are cases where the delay $\tau$ has a negative value in the case where the LPC residual signal and the mean-based signal are used.

With the processing described above, it is possible to extract the pitch mark time only from the original speech signal s(t) with high accuracy.

<Extraction Section 116>

The extraction section 116 of the feature value extraction section 110 extracts the feature value (for example, at least one of the formant frequency and the bandwidth of the formant frequency) from the thus determined pitch mark time $t_i^s$, the original speech signal s(t), the LPC residual signal e(t), and the autocorrelation function $R_{ss}$ (S116, see Reference 1), and outputs the feature value.

For example, the extraction section 116 determines a value V(p) by using the pitch mark time $t_i$s, the original speech signal s(t), and the LPC residual signal e(t) according to the following expression:

[Formula 12]

$$V(p) \cong \sum_{i=0}^{I} w(t_i^s - p) w(t_i^s) \sum_{j=-M/2}^{M/2} e(t_i^s - j) s(t_i^s - p - j)$$

where w(m) is the above-described window function. Next, the extraction section 116 obtains an LPC coefficient $\hat{a}(p)$ by using the value V(p) and the autocorrelation function $R_{ss}$ based on the following expression:

[Formula 13]

$$\begin{pmatrix} R_{ss}(0) & \cdots & R_{ss}(P-1) \\ \vdots & \ddots & \vdots \\ R_{ss}(P-1) & \cdots & R_{ss}(0) \end{pmatrix} \begin{pmatrix} \hat{a}(1) \\ \vdots \\ \hat{a}(P) \end{pmatrix} = \begin{pmatrix} R_{ss}(1) - V(1) \\ \vdots \\ R_{ss}(P) - V(P) \end{pmatrix}$$

Further, at least one of the formant frequency and the bandwidth of the formant frequency is determined from the LPC coefficient $\hat{a}(p)$. The method for determining the formant frequency $F_p$ and the bandwidth $B_p$ from the LPC coefficient $\hat{a}(p)$ is as described in the first embodiment. That is, roots $z_1, \ldots, z_p$ of the prediction polynomial obtained with the LPC coefficient $\hat{a}(p)$ are determined. At this point, let $\theta_1, \ldots, \theta_p$ denote angles of the imaginary roots, and let $r_1, \ldots, r_p$ denote magnitudes thereof. The angle $\theta_p$ and the formant frequency $F_p$ satisfy the relationship of the expression (1) described above, and hence the formant frequency $F_p$ is determined by inversely transforming $\theta_p$. In addition, the magnitude $r_p$ and the bandwidth $B_p$ satisfy the relationship of the expression (2) described above, and hence the bandwidth $B_p$ may be appropriately determined by inversely transforming the magnitude $r_p$.

[Formula 14]

$$\theta_p = \frac{2\pi F_p}{f_s} \quad (1)$$

[Formula 15]

$$r_p = e^{-\frac{\pi B_p}{f_s}} \quad (2)$$

<Effect>

With this configuration, in the present embodiment, it is possible to obtain the same effects as those of the first embodiment without using the device such as the EGG.

<Modification>

The PEAR is used for formant extraction in each of the first embodiment and the second embodiment described above, but linear predictive coding (LPC) may also be used.

Instead of returning (reproducing) the post-conversion speech signal to the speaker in real time, the post-conversion speech signal may also be returned to the speaker after a lapse of a little time (e.g., after one second). In such a case as well, the learner can intuitively improve the pronunciation by checking the correct pronunciation immediately afterward.

The formant frequency may be visually given concurrently with returning of the post-conversion speech signal to the speaker.

In the example of the conversion section 120 described above, the formant frequency having a target frequency of 862 Hz as the formant frequency $F_p'$ is explicitly provided, but a shift amount which converts the formant frequency of the original speech signal s(t) to the formant frequency of the target speech signal may be provided. For example, in the case where Sp denotes the shift amount, $F_p'=F_p+S_p$ is satisfied and, when $F_p'$ is converted to $\theta_p'$ by using a relational expression with $\theta_p'$, it is possible to perform the conversion of the speech signal by using the expressions (3) and (4). The shift amount $S_p$ can be determined based on a difference $Sp=\bar{F}_p'-\bar{F}_p$ between the average $\bar{F}_p$ of the formant frequencies of native Japanese speakers and the average $\bar{F}'_p$ thereof of native English speakers.

While the pronunciation of a non-native speaker is converted to that of a native speaker in the present embodiment, the conversion of the pronunciation between native speakers such as the conversion of the pronunciation of a dialect of a native speaker to the pronunciation of the standard language of a native speaker may be performed, or the conversion between non-native speakers may also be performed.

<Other Modifications>

The present invention is not limited to the embodiments or the modifications described above. For example, various processing described above may be executed time-sequentially according to the description as well as being executed in parallel or individually according to processing capacity of a device which executes the processing or on an as-needed basis. In addition, the present invention may be appropriately changed without departing from the gist of the present invention.

<Program and Recording Medium>

In addition, various processing functions in the individual devices described in the embodiments and the modifications described above may be implemented by a computer. In this case, the processing content of the functions which the individual device should have is described in a program. By executing the program with the computer, the various processing functions in the individual devices are implemented on the computer.

The program in which the processing content is described can be recorded in a computer-readable recording medium. As the computer-readable recording medium, for example, any of a magnetic recording device, an optical disk, a magneto-optical recording medium, and a semiconductor memory may be used.

In addition, distribution of the program is performed by, e.g., selling, transferring, or lending a portable recording medium in which the program is recorded such as a DVD or a CD-ROM. Further, the program may also be distributed by pre-storing the program in a storage device of a server computer and transferring the program from the server computer to another computer via a network.

First, for example, the computer which executes such a program temporarily stores the program recorded in the portable recording medium or the program transferred from the server computer in a storage section of the computer. Subsequently, at the time of execution of processing, the computer reads the program stored in the storage section of the computer, and executes processing corresponding to the read program. As another execution mode of the program, the computer may read the program directly from the portable recording medium and execute processing corresponding to the program. Further, every time the program is transferred to the computer from the server computer, processing corresponding to the received program may be executed one by one. In addition, the above processing may be executed with a so-called ASP (Application Service Provider)—type service in which the transfer of the program to the computer from the server computer is not performed and the processing function is implemented only with an execution instruction and result acquisition. Note that the program includes information which is used for processing by an electronic calculator and is based on the program (data which is not a direct command to the computer and has a property which specifies the processing of the computer or the like).

In addition, the individual devices are configured by executing a predetermined program on a computer, but at least part of the processing contents may be implemented by using hardware.

The invention claimed is:

1. A pronunciation conversion apparatus comprising:
an LPC analysis section which determines an LPC residual signal using an LPC coefficient associated with a first speech signal of a speech segment, the first speech signal being obtained when a first speaker who speaks a given language as his/her native language speaks another language;
a pitch mark analysis section which calculates an impulse train corresponding to an EGG glottal closure time;
a cross-correlation estimation section which estimates a delay of the LPC residual signal relative to the EGG glottal closure time;
a pitch mark time estimation section which estimates a pitch mark time based at least on the delay, the impulse train and the LPC residual signal;
an extraction section which extracts a first feature value corresponding to the first speech signal from the pitch mark time and the first speech signal; and
a conversion section which converts the first feature value such that the first feature value approaches a second feature value corresponding to a second speech signal obtained when a second speaker who speaks the other language as his/her native language speaks the other language, wherein
each of the first feature value and the second feature value is a feature value capable of representing a difference in pronunciation, and
the pronunciation conversion apparatus presents a speech signal obtained from the first feature value after the conversion to the first speaker in real time.

2. The pronunciation conversion apparatus according to claim 1, including:
a speech segment detection section which detects a speech segment of the first speech signal;
the LPC analysis section which obtains the LPC coefficient from the first speech signal of the speech segment through LPC analysis by using the first speech signal and the speech segment;
the pitch mark analysis section which calculates the impulse train corresponding to the EGG glottal closure time by using the first speech signal; and
the cross-correlation estimation section which estimates the delay of the LPC residual signal relative to the EGG glottal closure time by estimating a cross-correlation between the LPC residual signal and the impulse train.

3. The pronunciation conversion apparatus according to claim 1, wherein
let z denote a root of a prediction polynomial obtained with a linear prediction coefficient, and the conversion section determines a conversion filter

[Formula 16]

[Formula 16]

$$F(z) = \frac{\frac{1}{A'(z)}}{\frac{1}{A(z)}}$$

from a first vocal tract spectrum A(z) corresponding to the first feature value and a second vocal tract spectrum A'(z) corresponding to the second feature value, and converts the first feature value by using the conversion filter F(z).

4. The pronunciation conversion apparatus according to claim 3, wherein
let $r_p$ denote a magnitude of an imaginary root of the prediction polynomial obtained with the linear prediction coefficient determined from the first speech signal, let $\theta_p$ denote an angle of the imaginary root of the prediction polynomial obtained with the linear prediction coefficient, the first vocal tract spectrum A(z) is expressed as

[Formula 17]

$$A(z) = \prod_{p=1}^{P}(1-c_p z^{-1})(1-c_p^* z^{-1})$$
$$c_p = r_p \cos\theta_p + jr_p \sin\theta_p$$
$$c_p^* = r_p \cos\theta_p - jr_p \sin\theta_p,$$

the second vocal tract spectrum A'(z) is expressed as

[Formula 18]

$$A'(z) = \prod_{p=1}^{P}(1-c_p' z^{-1})(1-c_p'^* z^{-1}), \text{ and}$$

[Formula 19]

$$c_p' = r_p \cos\theta_p' + jr_p \sin\theta_p'$$
$$c_p'^* = r_p \cos\theta_p' - jr_p \sin\theta_p', \text{ or}$$

[Formula 20]

$$c_p' = r_p' \cos\theta_p + jr_p' \sin\theta_p$$
$$c_p'^* = r_p' \cos\theta_p - jr_p' \sin\theta_p, \text{ or}$$

[Formula 21]

$$c_p' = r_p' \cos\theta_p' + jr_p' \sin\theta_p'$$
$$c_p'^* = r_p' \cos\theta_p' - jr_p' \sin\theta_p'$$

is satisfied, let $F'_p$, denote a formant frequency of the second speech signal, let $\theta_p$ denote a sampling frequency, let $B'_p$ denote a bandwidth of the formant frequency of the second speech signal, and

[Formula 22]

$$\theta_p' = \frac{2\pi F_p'}{f_s}$$

[Formula 23]

$$r_p' = e^{-\frac{\pi B_p'}{f_s}}$$

are satisfied.

5. The pronunciation conversion apparatus according to claim 1, wherein
the conversion section gives a random number to the second feature value to convert the first feature value such that the first feature value approaches the second feature value to which the random number is given.

6. A pronunciation conversion method comprising:
determining an LPC residual signal using an LPC coefficient associated with a first speech signal of a speech segment, the first speech signal being obtained when a first speaker who speaks a given language as his/her native language speaks another language;
calculating an impulse train corresponding to an EGG glottal closure time;
estimating a delay of the LPC residual signal relative to the EGG glottal closure time;
estimating a pitch mark time based at least on the delay, the impulse train and the LPC residual signal;
extracting a first feature value corresponding to the first speech signal from the pitch mark time and the first speech signal; and
a conversion step of causing a conversion section to convert the first feature value such that the first feature value approaches a second feature value corresponding to a second speech signal obtained when a second speaker who speaks the other language as his/her native language speaks the other language, wherein
each of the first feature value and the second feature value is a feature value capable of representing a difference in pronunciation, and
presented, by a pronunciation conversion apparatus, a speech signal obtained from the first feature value after the conversion to the first speaker in real time.

7. A non-transitory computer-readable recording medium that records a program for causing a computer to function as the pronunciation conversion apparatus according to claim 1.

* * * * *

UNITED STATES PATENT AND TRADEMARK OFFICE
CERTIFICATE OF CORRECTION

| | |
|---|---|
| PATENT NO. | : 11,557,287 B2 |
| APPLICATION NO. | : 17/049554 |
| DATED | : January 17, 2023 |
| INVENTOR(S) | : Sadao Hiroya |

It is certified that error appears in the above-identified patent and that said Letters Patent is hereby corrected as shown below:

In the Claims

In Column 15, Line 48 of Claim 4, the text reading:
-speech signal, let $\theta_p$ denote a sampling frequency,-
Should read:
--speech signal, let $f_s$ denote a sampling frequency,--

Signed and Sealed this
Fifth Day of September, 2023

*Katherine Kelly Vidal*
Katherine Kelly Vidal
*Director of the United States Patent and Trademark Office*